US00RE47286E

(19) United States
(12) Reissued Patent
Ohnaka et al.

(10) Patent Number: US RE47,286 E
(45) Date of Reissued Patent: Mar. 12, 2019

(54) VEHICLE BODY FRONT STRUCTURE

(71) Applicant: HONDA MOTOR CO., LTD., Minato-Ku, Tokyo (JP)

(72) Inventors: Ryo Ohnaka, Saitama (JP); Yoshinori Taguchi, Saitama (JP); Makoto Hisazumi, Saitama (JP); Naoyuki Hashimoto, Tochigi (JP)

(73) Assignee: Honda Motor Co., Ltd., Tokyo (JP)

(21) Appl. No.: 14/836,260

(22) Filed: Aug. 26, 2015

Related U.S. Patent Documents

Reissue of:

(64) Patent No.: 8,789,877
Issued: Jul. 29, 2014
Appl. No.: 13/838,844
Filed: Mar. 15, 2013

(30) Foreign Application Priority Data

Mar. 19, 2012 (JP) ..... 2012-062813
Mar. 19, 2012 (JP) ..... 2012-062814

(51) Int. Cl.
*B62D 21/15* (2006.01)
*B62D 25/08* (2006.01)

(52) U.S. Cl.
CPC ..... *B62D 21/152* (2013.01); *B62D 21/155* (2013.01); *B62D 25/082* (2013.01); *B62D 25/085* (2013.01)

(58) Field of Classification Search
CPC .. B62D 21/152; B62D 21/155; B62D 25/085; B62D 25/082; B60R 19/24; B60R 19/26;
(Continued)

(56) References Cited

U.S. PATENT DOCUMENTS 2,186,137 A * 1/1940 Halladay ..... B60R 19/28 293/137
3,751,093 A * 8/1973 Hebert ..... B60R 19/285 293/135

(Continued)

FOREIGN PATENT DOCUMENTS

DE 10 2013 012769 A1 2/2015
JP 3599327 B2 12/2004

(Continued)

OTHER PUBLICATIONS

English translation of JP 2006-137373 A.*

(Continued)

*Primary Examiner* — Peter C English
(74) *Attorney, Agent, or Firm* — Carrier Blackman & Associates, P.C.; Joseph P. Carrier; William D. Blackman

(57) ABSTRACT

A vehicle body front structure includes: a front side frame; a lower member placed at an outer side of the front side frame in the vehicle width direction; and a gusset placed between the front side frame and the lower member. The front side frame includes a first bending point which absorbs an impact load by being bent by receiving impact load upon a collision of the vehicle. An inner side of the gusset in the vehicle width direction is joined to the outer side of the front side frame in the vehicle width direction and extends from a front end of the front side frame to a first bending point. A tapered part which is inclined toward the front side frame as extending backward from the front end of the gusset is (Continued)

formed in an outer side of the gusset in the vehicle width direction.

22 Claims, 9 Drawing Sheets

(58) Field of Classification Search
CPC ..... B60R 19/34; B60R 2021/0023; B60R 2021/0025
See application file for complete search history.

(56) References Cited

U.S. PATENT DOCUMENTS 3,820,834 A * 6/1974 Wilfert et al. ..... B60R 19/14 293/131
3,823,968 A * 7/1974 Barenyi ..... B60R 19/26 293/131
3,905,454 A * 9/1975 Brooks ..... B60R 19/36 267/154
4,183,574 A * 1/1980 Klie et al. ..... B62D 21/152 280/781
4,358,152 A * 11/1982 Mayer et al. ..... B62D 21/152 180/89.1
5,611,568 A * 3/1997 Masuda ..... B62D 21/152 280/784
5,913,565 A * 6/1999 Watanabe ..... B62D 21/152 296/187.03
6,460,889 B2 * 10/2002 Iyanagi et al. ..... B62D 21/152 280/784
6,598,933 B2 7/2003 Taguchi et al.
7,469,956 B2 12/2008 Yasuhara et al.
8,118,349 B2 2/2012 Kihara et al.
8,398,153 B1 3/2013 Dandekar et al.
8,408,636 B1 * 4/2013 Slaats et al. ..... B62D 21/152 280/784
8,608,231 B1 12/2013 Mendivil et al.
8,720,961 B2 5/2014 Han
8,733,823 B2 5/2014 Brockhoff et al.
8,827,356 B2 9/2014 Baccouche et al.
8,857,902 B2 10/2014 Sekiguchi et al.
8,899,662 B2 * 12/2014 Kido et al. ..... B62D 25/088 296/187.09
8,919,835 B1 12/2014 Han et al.
8,985,671 B1 3/2015 Lei et al.
2004/0195862 A1 * 10/2004 Saeki ..... B62D 21/152 296/187.09
2008/0272619 A1 * 11/2008 Fujikawa ..... B62D 21/152 296/187.09
2010/0127531 A1 * 5/2010 Yasuhara et al. .... B62D 21/152 296/187.09
2011/0095568 A1 * 4/2011 Terada et al. ..... B62D 21/152 296/187.09
2013/0241233 A1 9/2013 Ohnaka et al.
2013/0256051 A1 10/2013 Nakamura et al.
2014/0008923 A1 1/2014 Han et al.
2014/0008924 A1 1/2014 Han et al.
2014/0159420 A1 6/2014 Hashimoto et al.
2014/0167450 A1 6/2014 Sotoyama et al.
2014/0361559 A1 12/2014 Sakakibara et al.
2014/0361560 A1 12/2014 Sakakibara et al.

FOREIGN PATENT DOCUMENTS

JP 2006-137373 A 6/2006
JP 2010-11600 A 5/2010
JP 4680784 B2 5/2011
JP 2012-166743 A 9/2012
JP 2012-228907 A 11/2012
JP 2013-226867 A 11/2013
JP 2013-241034 A 12/2013
JP 2014-113892 A 6/2014
JP 2014-156199 A 8/2014
JP 2015-009712 A 1/2015
JP 2015-016727 A 1/2015
JP 2015-016729 A 1/2015
WO 2014/042041 A1 3/2014
WO 2014/042257 A1 3/2014
WO 2014/088045 A1 6/2014
WO 2014/115579 A1 7/2014
WO 2014/115580 A1 7/2014
WO 2014/126165 A1 8/2014
WO 2014/173476 A1 10/2014
WO 2014/199718 A1 12/2014

OTHER PUBLICATIONS

Notice of Reasons for Rejection issued in corresponding Japanese patent application JP 2012-062814 and dispatched from the JPO on Jan. 21, 2014.

* cited by examiner

"Amended"

VEHICLE BODY FRONT STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application claims the priority of Japanese Applications No. 2012-062813, filed on Mar. 19, 2012 and 2012-068814 filed on Mar. 19, 2012, the entire specification, claims and drawings of which are incorporated herewith by reference.

BACKGROUND OF THE INVENTION

1. Field of the Invention

The present invention relates to a vehicle body front structure.

2. Description of the Related Art

A conventional vehicle body front structure, including: a front side frame extending along a vehicle front-rear direction; a member placed at an outer side of the front side frame in a vehicle width direction; and a connecting component for connecting the front side frame and the member, is known (for example, see JP 3,599,327 B).

Meanwhile, the vehicle body is desired to absorb impact energy by propagating an impact load to the front side frame in addition to the member such that the shape of the front side frame is deformed at the time of a narrow offset collision in which a colliding object, such as an oncoming vehicle, is crashed at a position outward of the front side frame in the vehicle width direction.

However, since the connecting component is placed behind the front end of the front side frame in the structure described in JP 3,599,327 B, the impact load in early stages of the collision cannot be propagated to the front side frame, and thus the shape of the front side frame may not be deformed sufficiently.

In order to solve such problems, JP 4,680,784 B discloses an invention that has large width at the front end of the front side frame and directly connects the front end of the front side frame and the front end of the member. Even if the colliding object collides against only the member, it is possible to propagate the impact load to the front side frame smoothly via the member and thus it is possible to deform the shape of the front side frame sufficiently.

SUMMARY OF THE INVENTION

However, since the invention described in JP 4,680,784 B directly fixes the front side frame and the member together, the space between the front side frame and the member are inevitably small and thus it is difficult to place in-vehicle parts into this space. As a result, restrictions arise in the locations at which the in-vehicle parts are placed and therefore there is a problem of small flexibility in the layout.

The present invention is made in view of the above view-point, and an object of the present invention is to provide a vehicle body front structure that reliably propagates the impact load at the time of a narrow offset collision to the front side frame and has sufficient space between the front side frame and the member.

In order to achieve the above object, the present invention provides a vehicle body front structure, comprising: a front side frame which extends along a vehicle front-rear direction; a lower member placed at an outer side of the front side frame in a vehicle width direction; and a gusset placed between the front side frame and the lower member, wherein the front side frame has a bending point which is provided at a part along the front side frame in the vehicle front-rear direction and absorbs an impact load by receiving the impact load and being bent upon a collision of a vehicle; an inner side of the gusset in the vehicle width direction is joined to an outer side of the front side frame in the vehicle width direction and extends from a front end of the front side frame to the bending point; and a tapered part which is inclined toward the front side frame as extending backward from a front end of the gusset is formed at an outer side of the gusset in the vehicle width direction.

According to the present invention, since the inner side of the gusset in the vehicle width direction is joined to the outer side of the front side frame in the vehicle width direction and extends from the front end of the front side frame to the bending point, impact load applied to the gusset can be propagated to the front side frame reliably at the time of a narrow offset collision. In particular, since the inner side of the gusset in the vehicle width direction extends to the bending point of the front side frame, impact load can be propagated to the bending point reliably and it is possible to absorb the impact load by the front side frame being bending-deformed.

In addition, according to the present invention, since the gusset is placed between the front side frame and the lower member, it is possible to obtain placement space of in-vehicle parts suitably between the front side frame and the lower member. In particular, according to the present invention, since the tapered part which is inclined toward the front side frame as extending backward from a front end of the gusset is formed at an outer side of the gusset in the vehicle width direction, it is possible to obtain placement space for in-vehicle parts between the front side frame and the lower member by suitably adjusting the position of the rear end of the tapered part (stabled position) in the vehicle front-rear direction. As a result, it is possible to improve flexibility in the layout of in-vehicle parts.

In addition, in the present invention, it is preferable if, the gusset has a hollow part, and a first bulkhead which extends along the vehicle front-rear direction is placed in the hollow part.

According to such a structure, it is possible to prevent cross-sectional deformation caused by the impact load by improving strength and rigidity of the gusset. Therefore, it is possible to propagate the impact load to the front side frame reliably by the retracted gusset and bending-deform the front side frame at the time of a narrow offset collision.

In addition, in the present invention, it is preferable if, the gusset has an extension part which extends backward from a rear end of the tapered part to the bending point, and a second bulkhead is placed inside the front side frame at a position that overlaps with the rear end of the tapered part of the gusset along the vehicle width direction.

According to such a structure, it is possible to reinforce a part (a part at which the direction of the load propagation path changes) in the front side frame at a boundary between the tapered part of the gusset and the extension part by the second bulkhead and propagate the load between the tapered part and the extension part smoothly.

In addition, if is preferable if the rear end of the tapered part of the gusset is placed at frontward of the bending point of the front side frame, and a stiffener which extends backward at least from the rear end of the tapered part of the gusset is placed inside the front side frame.

According to such a structure, it is possible to reinforce the front side frame with the stiffener and propagate the load to the bending point smoothly.

In addition, in the present invention, it is preferable if a front end of the lower member is joined to the tapered part of the gusset.

According to such a structure, it is possible to propagate the impact load applied to the gusset to the lower member also at the time of a narrow offset collision and therefore propagate to the front side frame and the lower member distributively.

In addition, in the present invention, it is preferable if a high rigidity part which extends along the vehicle front-rear direction is formed in the extension part.

According to such a structure, strength and rigidity of the extension part improve, and even in a case where the width of the extension part is small, it is possible to propagate the impact load to the bending point reliably. In addition, since the width of the extension part can be made small, it is possible to obtain the placement space for in-vehicle parts further between the front side frame and the lower member.

In addition, in the present invention, it is preferable if the front side frame and the gusset respectively have a hat-shaped cross-section in which a pair of flanges is formed at upper and lower ends and the pair of flanges extends along the vehicle front-rear direction, and are joined together via the flange.

According to such a structure, since the front side frame and the gusset respectively have a hat-shaped cross-section in which a pair of flanges that extends along the vehicle front-rear direction is formed at upper and lower ends, and are joined together via the flange, a total of four flange ridgelines can be formed up and down along the vehicle front-rear direction, and thus it is possible to improve strength and rigidity of the gusset against the impact load. In addition, it is possible to propagate the impact load applied to the gusset to the front side frame reliably through four flange ridgelines at the time of a narrow offset collision, and thus it is possible to absorb impact energy by the front side frame being bending-deformed.

In addition, in the present invention, it is preferable if, the gusset has a front wall, the tapered part is inclined toward the front side frame as extending backward from an outer side of the front wall in the vehicle width direction, the lower member includes a curved part which is formed in a front end of the lower member and is curved to the gusset side to be joined to the tapered part, and a peripheral surface of a corner formed by the front wall and the curved part forms a curved surface.

According to such a structure, since it is possible to avoid large stress being locally applied to the connecting part of the gusset and the lower member or the front end of the lower member at the time of a narrow offset collision, it is possible to propagate the impact load efficiently to the front side frame and the lower member, and therefore it is possible to propagate to the upper member the impact load input to the lower member.

In addition, in the present invention, it is preferable if, the gusset further includes a plurality of flange pieces which extend from the front wall and the tapered part, the lower member includes a plurality of flange pieces which extend from the curved part, and the gusset and the lower member are joined together via the flange pieces.

According to such a structure, it is possible to propagate the impact load applied to the gusset to the lower member suitably at the time of a narrow offset collision, and therefore it is possible to propagate the impact load distributively to the front side frame and the lower member, and thus it is possible to improve absorbability of impact energy. Meanwhile, since the gusset and the lower member are joined via the flange piece, it is possible to obtain a structure having brittleness such that the front end side of the front side frame can be crushed at the time of a full flat collision where an oncoming vehicle or the like is crashed into the bumper beam of the vehicle.

In addition, in the present invention, it is preferable if, the gusset includes a bottom wall which extends backward from a lower end of the front wall, a [dent] *curved* part which [resides] *is curved* upward *and outward* as compared to an inner side of the bottom wall in the vehicle width direction is provided at an outer side in the bottom wall in the vehicle width direction, a lower flange piece which extends downward is provided at an outer side in the [dent] *curved* part *of the bottom wall* in the vehicle width direction, a lower member side lower flange piece which is joined to the lower flange piece is provided in the curved part of the lower member, and a fog lamp is placed at downward of the lower flange piece and frontward of the corner.

According to such a structure, it is possible to obtain clearance between the lower flange piece and the fog lamp placed downward of the lower flange piece and frontward of the corner. Therefore, even if the fog lamp moves rearward while being shaken up and down upon the vehicle colliding lightly, it is possible to prevent breakage of the fog lamp by avoiding the collision between the lower flange and the fog lamp. In addition, it is possible to perform sandwiching weld bonding between the lower flange piece and the lower flange piece at the lower member side by using the space at the [dent] *curved* part *of the bottom wall* to place a welding device.

In addition, in the present invention, it is preferable if, a first plate joined to the front end of the front side frame; and a second plate which is placed frontward of the first plate and to which a rear end of a bumper beam extension is attached, wherein an inner side of the front wall in the vehicle width direction is held sandwiched between the first plate and the second plate, and the front wall, the first plate, and the second plate are fastened together.

According to such a structure, since the front wall is difficult to be separated from the first installation plate at the time of a narrow offset collision, it is possible to support the impact load reliably.

In addition, in the present invention, it is preferable if, the gusset includes a top wall which extends backward from an upper end of the front wall, the top wall, the front wall, and the bottom wall are formed together by press molding, a depressed portion which is depressed downward is formed in the top wall at a boundary with the front wall, and a depressed portion which is depressed upwards is formed in the bottom wall at a boundary with the front wall.

According to such a structure, it is possible to prevent formation of wrinkles by absorbing laxation in the top wall and the bottom wall with the depressed portion in the top wall and the bottom wall and improve strength and rigidity of the gusset.

In addition, in the present invention, it is preferable if, the gusset further includes: an extension part which extends backward from a rear end of the tapered part to the bending point; and an extended flange which is provided at least one of an upper end and a lower end of the extension part.

According to such a structure, it is possible to propagate the impact load reliably to the bending point by the extension part. In particular, as a result of having the extended flange in the extension part, it is possible to improve strength and rigidity of the extension part, and thus it is possible to improve the load propagation efficiency to the bending point.

In addition, in the present invention, it is preferable if, the extension part is joined to the outer side of the front side frame in the vehicle width direction, a bead which extends along the vehicle front-rear direction to protrude in a direction opposite to the front side frame, and a closed cross-section is formed between the bead and the front side frame.

According to such a structure, it is possible to improve strength and rigidity of the extension part by providing the bead in the extension part. In addition, it is possible to obtain a structure whose strength and rigidity are improved further by the closed cross-section being formed between the bead and front side frame. Thereby, it is possible to improve load propagation efficiency to the bending point.

According to the present invention, it is possible to provide a vehicle body front structure that can propagate the impact load at the time of a narrow offset collision reliably to the front side frame and has sufficient space between the front side frame and the member.

DETAILED DESCRIPTION OF THE INVENTION

Figure 1:
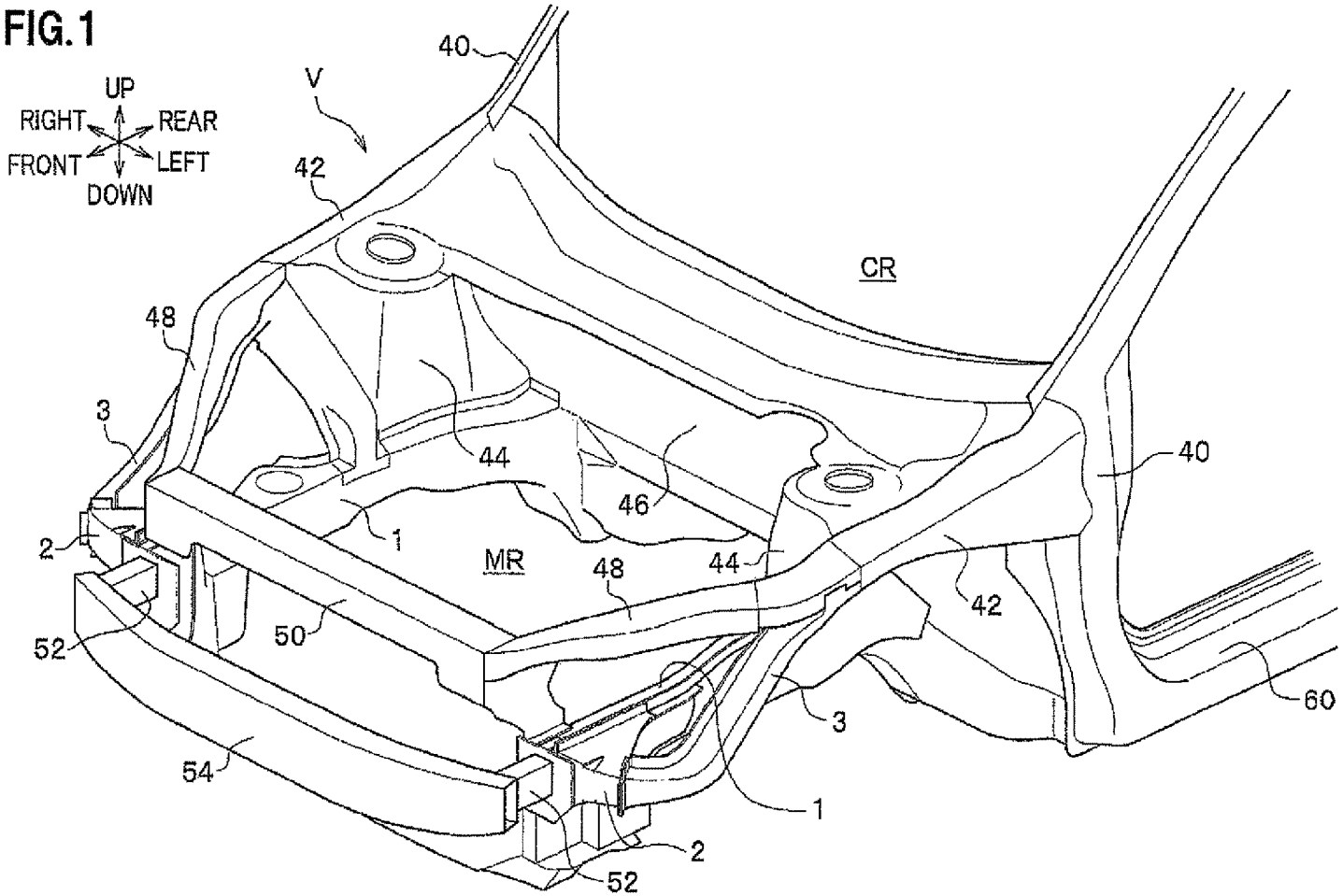
FIG. 1 is a perspective view of a front part of the vehicle body to which the vehicle body front structure according to an embodiment of the present invention is applied.

Next, embodiments of the present invention will be described in detail with reference to the drawings as appropriate. It should be noted that "front" and "rear", and "up" and "down" shown with arrows in the drawings indicate the vehicle front-rear direction and the vehicle body up-down direction, respectively, and "right" and "left" indicates the left-right direction (vehicle width direction) when viewed from the driver's seat. In addition, in this embodiment, a longitudinal cross-section indicates a vertical cross-section and a traverse cross-section indicates a horizontal cross-section.

Figure 2:
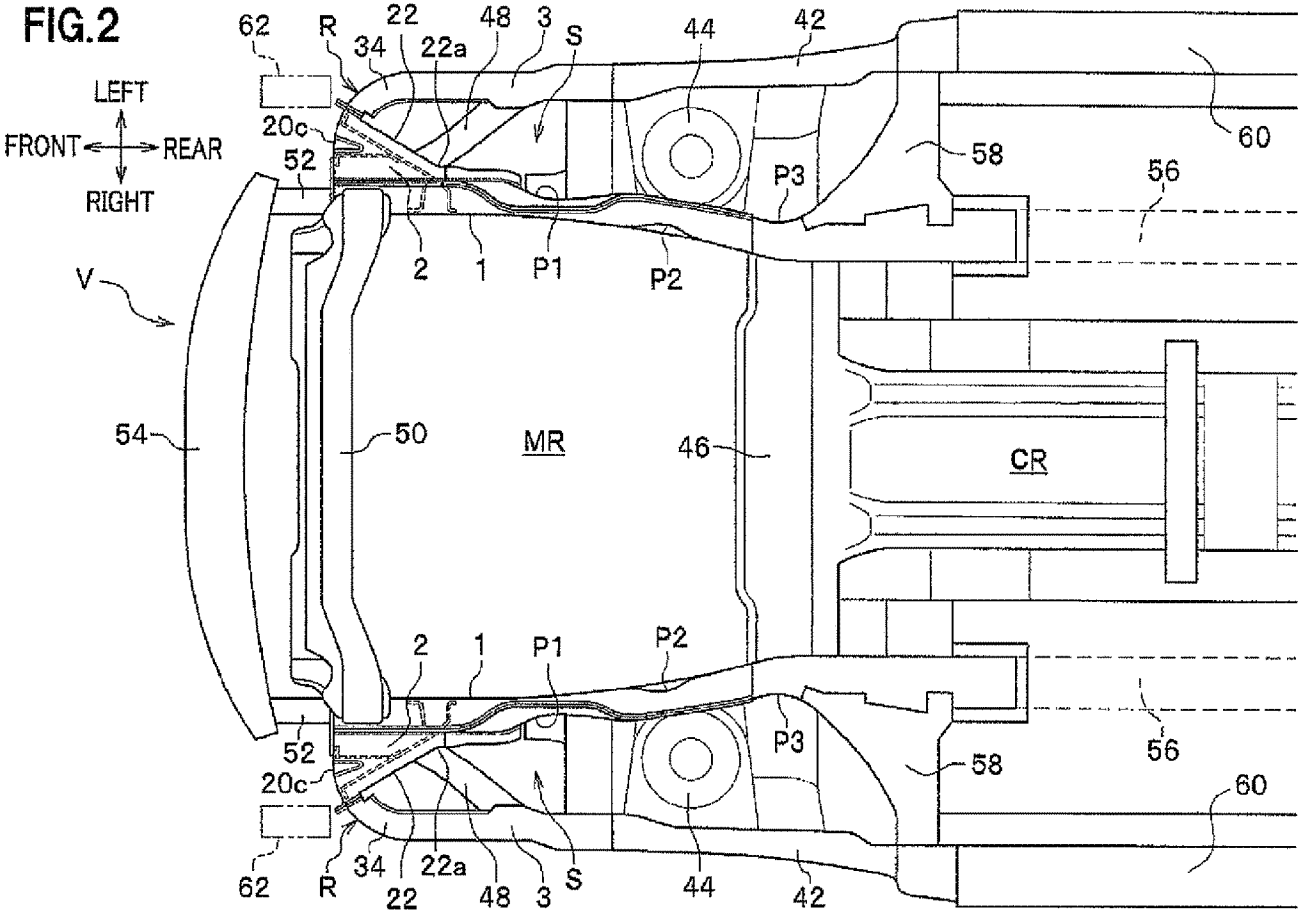
FIG. 2 is a bottom view of the front part of the vehicle body shown in FIG. 1.

FIG. 1 is a perspective view of the front part of the vehicle body to which the vehicle body front structure according to an embodiment of the present invention is applied. FIG. 2 is a bottom view of the front part of the vehicle body shown in FIG. 1. As shown in FIG. 1, a vehicle V includes: a pair of front side frames 1, 1 placed at both the right and left sides; and a pair of right and left upper members 42, 42 which extends from front pillars 40, 40 at both the right and left sides to frontwards and placed at upper outward side of the front side frame 1.

Placed between the front side frame 1 and the upper member 42 are a pair of right and left damper housings 44, 44 which accommodates dampers, (not illustrated), and extending along the vehicle width direction between rear ends of the damper housings 44, 44 is a dividing wall 46 which divides a power unit installation room MR and a vehicle interior CR.

A front bulkhead side 48 and a lower member 3 are fixed to a front end of the upper member 42 such that the front bulkhead side 48 and the lower member 3 bifurcate into an upper part and a lower part. The front bulkhead side 48 placed at the upper part is inclined toward the inner side in the vehicle width direction as extending forward, and the front end is fixed to the front bulkhead 50. The lower member 3 placed at the lower part is inclined downward gently as extending forward and then extends toward the inner side in the vehicle width direction (is curved), and the front end of the lower member 3 is connected to the front side frame 1 through the gusset 2.

In addition, a bumper beam 54 is connected to the front end of the front side frame 1 through bumper beam extensions 52. The vehicle exterior side ends of the front bulkhead 50 are fixed to the front end sides of the front side frame 1.

As shown in FIG. 2, the front side frame 1 extends to the side of the vehicle interior CR through the lower part of the dividing wall 46. The rear end of the front side frame 1 is connected to the front end of the floor frame 56 which extends along the vehicle front-rear direction and is connected to the in-vehicle side end of the outrigger 58 which extends along the vehicle width direction.

The out-vehicle side end of the outrigger 58 is connected to the front end side of the side sill 60 which extends in the vehicle front-rear direction along the end of the outer side in the vehicle width direction of the vehicle V.

Next, the structure of the front side frame 1, the gusset 2, and the lower member 3, which characterize the present invention, will be described in detail with reference to FIGS. 1 to 8 as suitable. It should be noted that since the vehicle V is left-right symmetrical, only the left part of the vehicle V will be described in the following description and the description of the right portion will be omitted.

<Front Side Frame>

As shown in FIG. 2, the front side frame 1 is a steel member that extends along the vehicle front-rear direction. Formed at a part along the front side frame 1 in the vehicle front-rear direction is a first bending point P1 to a third bending point P3, and the first bending point P1 to the third bending point P3 are formed by denting the front side frame 1 locally to the outer side or the inner side in the vehicle width direction. By forming the first bending point P1 to the third bending point P3, the front side frame 1 can receive impact load to be bent when the front part of the vehicle V is crashed with, for example, an oncoming vehicle, and thus it is possible to absorb impact energy (impact load) with bending-deformation of the front side frame 1.

Figure 3:
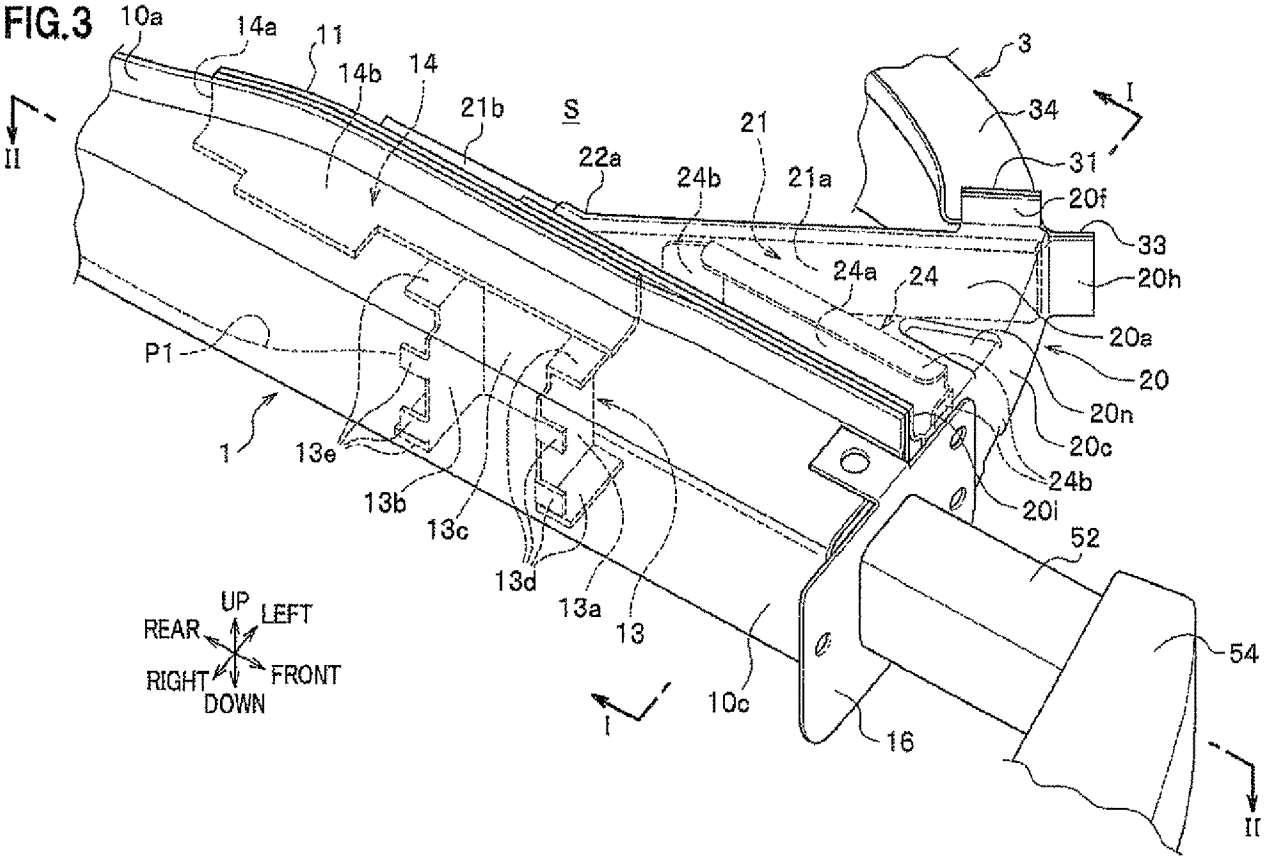
FIG. 3 is a perspective view of a left part of the front part of the vehicle body shown in FIG. 1 viewed downwards from a diagonal forward right direction.
Figure 4:
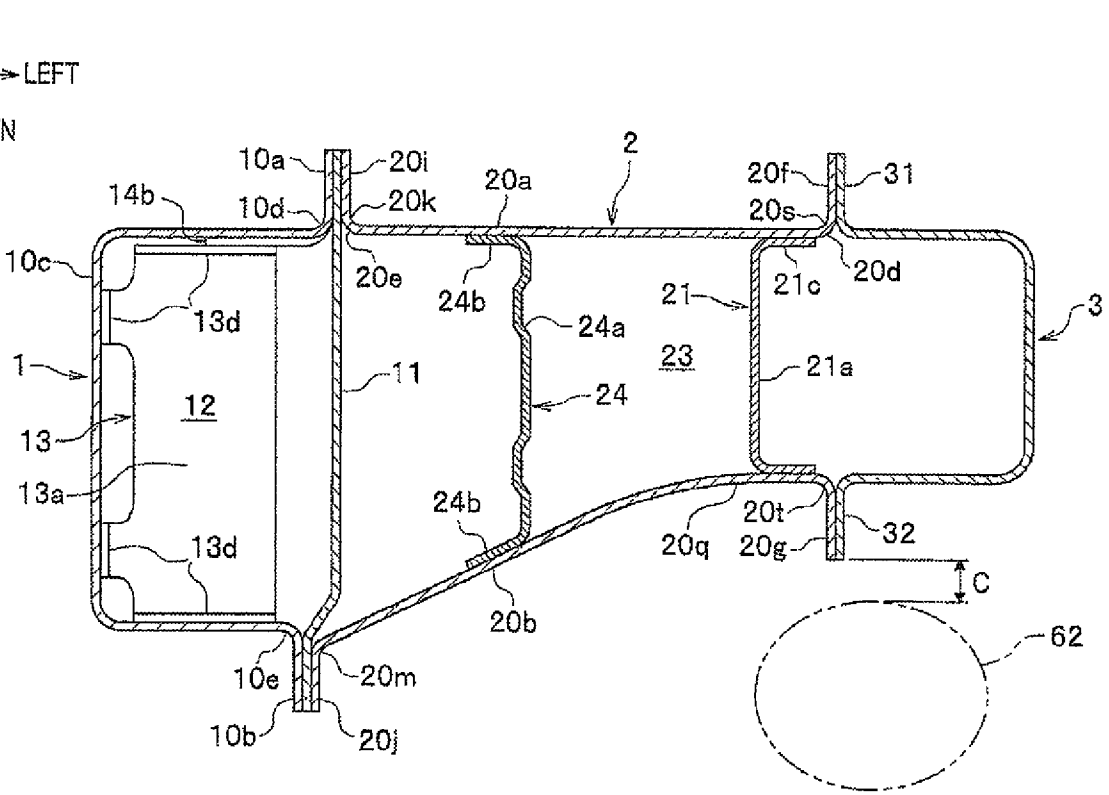
FIG. 4 is a cross-sectional view taken along the line I-I of FIG. 3.
Figure 5:
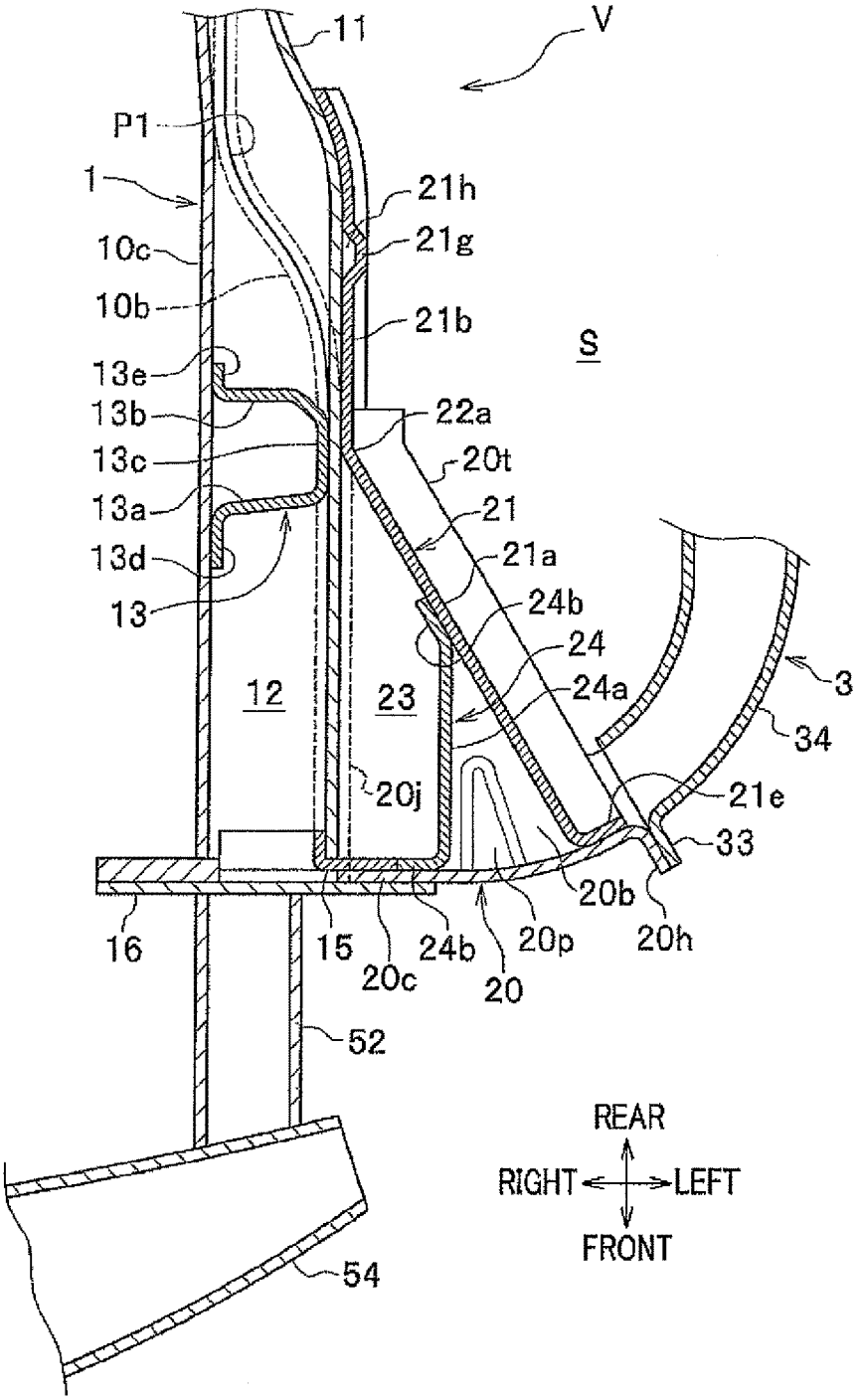
FIG. 5 is a cross-sectional view taken along the line II-II of FIG. 3.

FIG. 3 is a perspective view of the left part of the front part of the vehicle body shown in FIG. 1 viewed downwards from a diagonal right direction. FIG. 4 is a cross-sectional view taken along the line I-I of FIG. 3. FIG. 5 is a cross-sectional view taken along the line II-II of FIG. 3. As shown in FIG. 3 and FIG. 4, the front side frame 1 is a hollow frame material having a substantially square-shaped vertical cross-section. As shown in FIG. 4, the front side frame 1 includes: an inner member [10] *10a-10e* which is placed at in-vehicle side and has a hat-shaped vertical cross-section; and a substantially linear-shaped outer member 11 which is placed at the exterior side and has a vertical cross-section that extends in the up-down direction.

<Inner Member and Outer Member>

The inner member [10] *10a-10e* includes: a pair of an upper flange 10a and a lower flange 10b, each of which is joined together with the outer member 11 at a position of the outer member 11 in the up-down direction and extends along the vehicle front-rear direction; and a protruding hollow part 10c which continues from the upper flange 10a and the lower flange 10b and forms a closed cross-section 12 with the side surface of the outer member 11. *As shown, the protruding hollow part 10c includes three closed sides and one open side, while the upper flange 10a and the lower flange 10b are provided at upper and lower ends of the open side.* By forming such upper flange 10a and lower flange 10b, there are provided in the inner member [10] *10a-10e* an upper flange ridgeline 10d and a lower flange ridgeline 10e those extend along the vehicle front-rear direction. A bulkhead 13 and a stiffener 14 are placed in the closed cross-section 12.

<Bulkhead>

As shown in FIG. 5, the bulkhead 13, which is a second bulkhead, is a steel member that has a U-shaped horizontal cross-section. The bulkhead 13 is placed at a position that overlaps with the rear end 22a of the tapered part 22 of a gusset 2, which will be described later, along the vehicle width direction. By forming this bulkhead 13, it is possible to reinforce a portion corresponding to the boundary (a portion at which the direction of the load propagation path changes) between the tapered part 22 of the gusset 2 and the extension part 21b in the front side frame 1, and smoothly propagate the load between the tapered part 22 and the extension part 21b. That is, by the bulkhead 13, the propagation path of the impact load can be converted from the direction along the tapered part 22 to the direction along the front side frame 1 smoothly and easily.

As shown in FIG. 3, the bulkhead 13 includes: a front wall 13a and a rear wall 13b which are spaced apart with each other in the front-rear direction; a side wall 13c which connects out-vehicle side ends of the front wall 13a and the rear wall 13b; a plurality of flanges 13d and 13d which extend from upper and lower ends of the front wall 13a and in-vehicle side end to the front; and a plurality of flanges 13e and 13e which extend backward from upper and lower ends of the rear wall 13b and in-vehicle side end.

The front wall 13a and the rear wall 13b mainly serve to support impact load propagated from the tapered part 22. The side wall 13c mainly serves to receive the impact load propagated from the tapered part 22. The flanges 13d and 13e are joined to the protruding hollow part 10c of the inner member [10] *10a-10e* by a fixing means, such as welding.

<Stiffener>

The stiffener 14 is a steel member which has an L-shaped vertical cross-section as shown in FIG. 3. The front end side of the stiffener 14 is placed above the bulkhead 13 and the stiffener 14 extends from a position at the front side of the rear end 22a of the tapered part 22 to the first bending point P1. The front side frame 1 can be reinforced by providing the stiffener 14, and the load propagation can be performed smoothly to the first bending point P1. That is, the impact load converted into the direction along the front side frame 1 by the bulkhead 13 can be propagated reliably towards rearward (first bending point P1) along the front side frame 1.

The stiffener 14 includes: a vertical wall 14a which is sandwiched between the upper flange 10a of the inner member 10 and the outer member 11 at right and left and joined by a fixing means, such as welding; and a lateral wall 14b which extends from the lower end of the vertical wall 14a to the in-vehicle side and is fastened to the protruding hollow part 10c with a fixing means, such as a bolt. In addition, it is good as long as the stiffener 14 extends at least from a position that overlaps with the rear end 22a of the tapered part 22 to the first bending point P1 along the vehicle width direction.

<First Installation Plate and Second Installation Plate>

Figure 6:
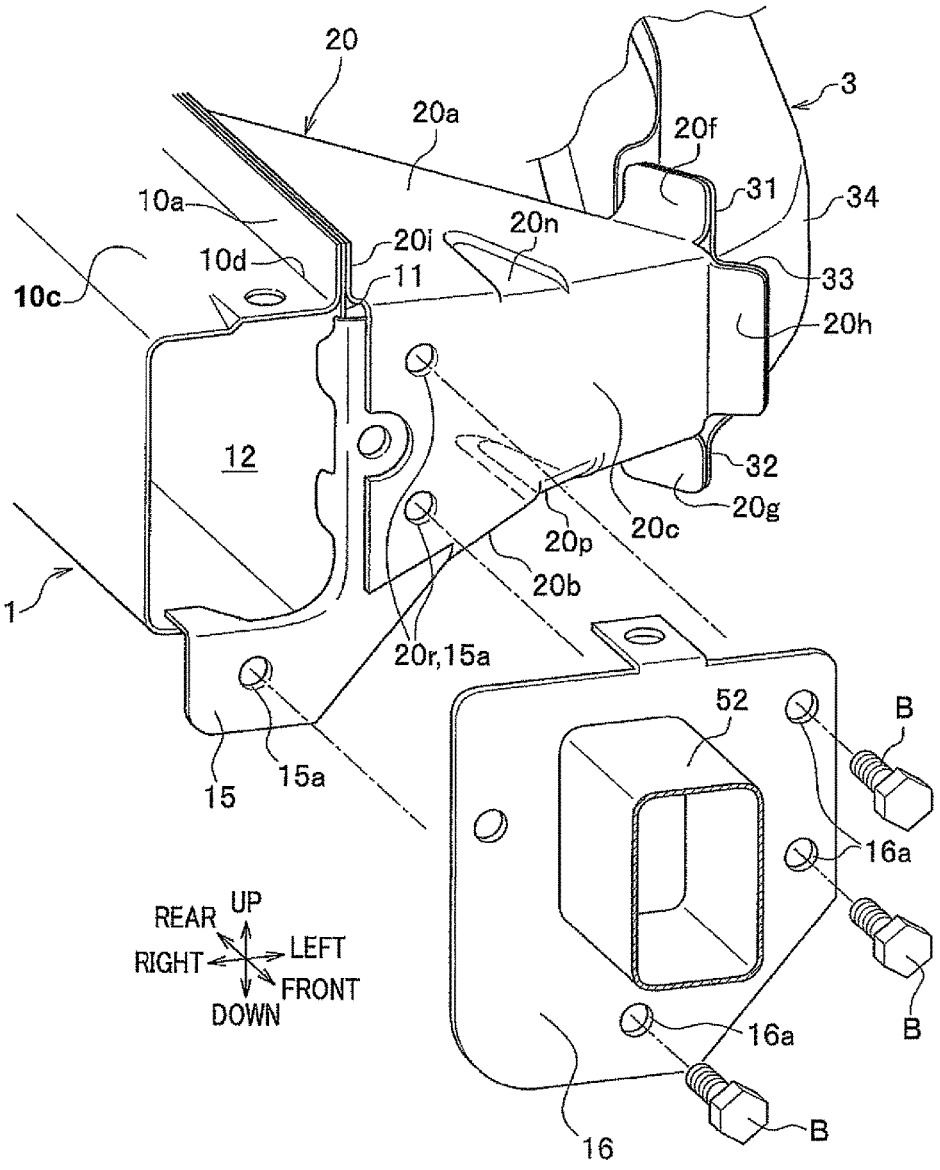
FIG. 6 is a perspective view of the left part of the front part of the vehicle body shown in FIG. 1 viewed from a diagonal right direction.

FIG. 6 is a perspective view of a left part of the front part of the vehicle body shown in FIG. 1 viewed from a diagonal right direction. As shown in FIG. 6, a first installation plate 15 which is substantially L-shaped is joined to the front end of the front side frame 1 by a fixing means, such as welding. A second installation plate 16 to which the rear end of the bumper beam extension 52 is attached is provided at frontward of the first installation plate 15. Bolt insertion holes 15a and 16a are formed in suitable places on the first installation plate 15 and the second installation plate 16, and the first installation plate 15 and the second installation plate 16 are fastened together with bolts B.

<Gusset>

As shown in FIG. 3 and FIG. 4, a gusset 2 is a steel member which is placed *laterally* between the front side frame 1 and the lower member 3 along the vehicle width direction and has a hat-shaped vertical cross-section. The gusset 2 is joined to the outer member 11 of the front side frame 1 to extend from the front end of the front side frame 1 to the first bending point P1. The gusset 2 includes: a body member 20 which has a triangular shape in [planer] *planar* view *such that a front end of the gusset is wider than a rear end thereof,* and has openings 20d and 20e formed in both the right and left sides; and a reinforcement member 21 which is placed separately from the body member 20 and is joined to the out-vehicle side of the body member 20 and the front side frame 1.

<Body Member>

Figure 7:
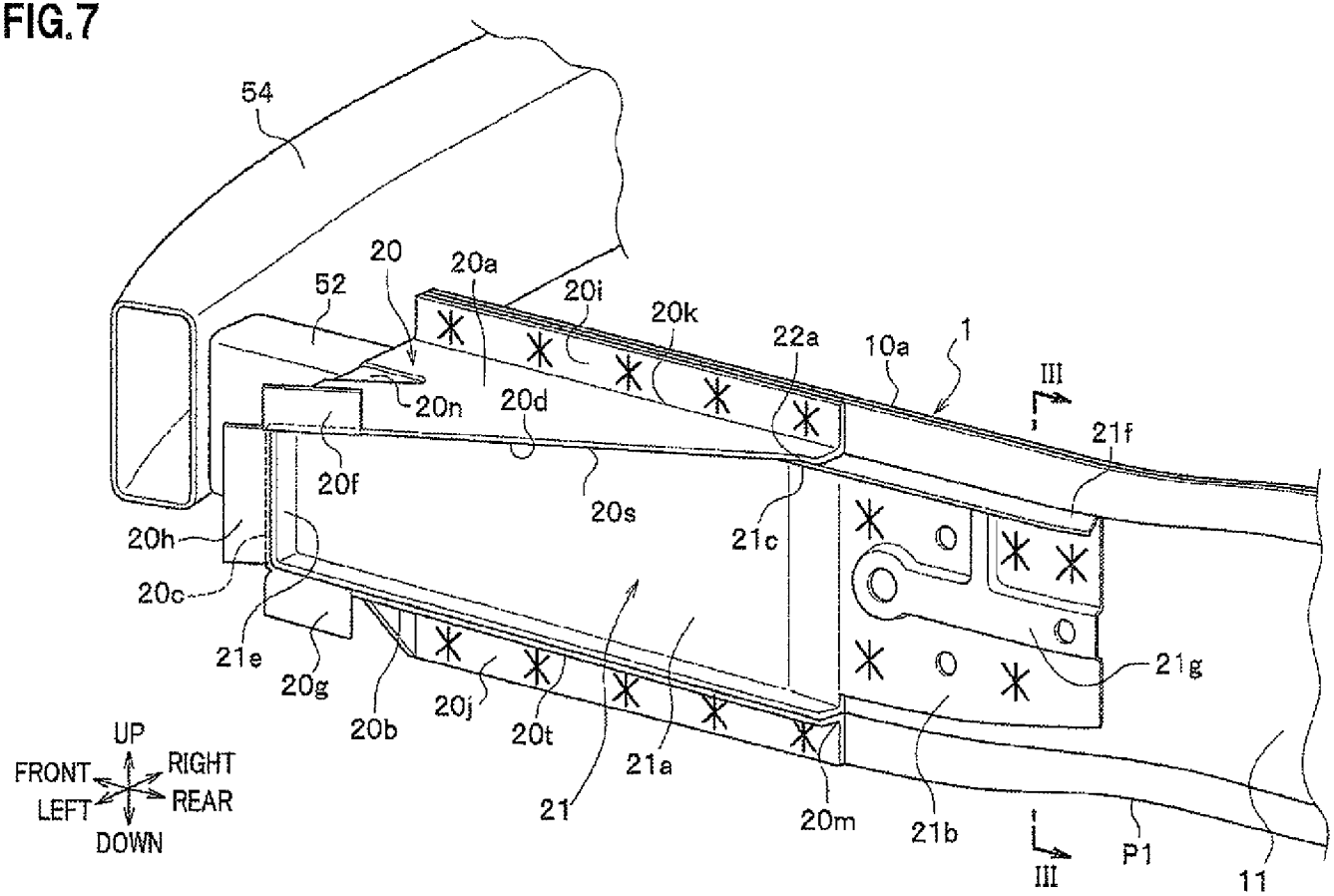
FIG. 7 is a perspective view of the left part in a state where the lower member is removed from the front part of the vehicle body shown in FIG. 1 viewed downwards from a diagonally rear left direction.

FIG. 7 is a perspective view of the left part with the lower member removed from the front part of the vehicle body shown in FIG. 1 viewed downward from a diagonally rear left direction. It should be noted that "*" in FIG. 7 shows welding points of spot welding with the front side frame 1. Although the front side frame 1 and the gusset 2 are joined together by spot welding in this embodiment, the joining may be performed by continuous welding, such as laser welding and MIG welding. As shown in FIG. 6 and FIG. 7, the body member 20 is a member which is formed along the vehicle front-rear direction by press molding one sheet of steel plate and has a U-shaped vertical cross-section. *In other words, a top wall 20a, a front wall 20c, and a bottom wall 20b are combined as a single pressed member.* The body member 20 includes: [a] *the* top wall 20a; [a] *the* bottom wall 20b which is spaced apart downward from the top wall 20a; and [a] *the* front wall 20c which connects the front ends of the top wall 20a and the bottom wall 20b.

<Top Wall>

The top wall 20a is a part that has a triangular shape in planar view. A flange piece 20f is formed to extend upwards at the front side of the out-vehicle side end 20s of the top wall 20a. An upper flange 20i which is joined together with the upper flange 10a of the inner member [10] *10a-10e* and the upper part of the side surface of the outer member 11 is formed to extend upward at the in-vehicle side end of the top wall 20a. The upper flange 20i is formed to extend over the entire length of the in-vehicle side end of the top wall 20a and extends along the vehicle front-rear direction.

As a result of having the upper flange 20i, an upper flange ridgeline 20k which extends along the vehicle front-rear direction is formed in the top wall 20a. In the top wall 20a, at substantially the center of the boundary with the front wall 20c, there is formed a depressed portion 20n having a triangular shape in planar view. As a result of having this depressed portion 20n, when press molding together the body member 20 that has the front wall 20c having a curved surface, it is possible to prevent formation of wrinkles by absorbing laxation in the top wall 20a by the depressed portion 20n and improve strength and rigidity of the body member 20.

<Bottom Wall>

The bottom wall 20b is a part which is formed in a shape that corresponds with the top wall 20a and has a triangular shape in planar view. A flange piece 20g is formed to extend downward at the front side of the out-vehicle side end 20t of the bottom wall 20b. A lower flange 20j, which is joined together with the lower flange 10b of the inner member 10 and the lower part of the side surface of the outer member 11, is formed to extend downward at the in-vehicle side end of the bottom wall 20b. The lower flange 20j is formed to extend over the entire length of the in-vehicle side end of the bottom wall 20b and extends along the vehicle front-rear direction. *As shown in FIG. 4, the gusset has an open inner side between the top and bottom walls 20a, 20b, with the pair of flanges 20i, 20j at upper and lower ends of the open inner side.*

As a result of having this lower flange 20j, a lower flange ridgeline 20m which extends along the vehicle front-rear direction is formed in the bottom wall 20b. As shown in FIG. 6, among the bottom walls 20b, a depressed portion 20p having a triangular shape in planar view is formed to be dented upwards in substantially the center of the boundary with the front wall 20c. As a result of having the depressed portion 20p, when press molding together the body member 20 having the front wall 20c having a curved shape, it is possible to prevent formation of wrinkles by absorbing laxation in the bottom wall 20b by the depressed portion 20p and improve strength and rigidity of the body member 20.

In addition, as shown in FIG. 4, a [dent] *curved* part 20q, which is [dented] *curved* upwards in a vertical cross-sectional view, is formed at the out-vehicle side of the bottom wall 20b. In detail, the bottom wall 20b is inclined upward as extending from the in-vehicle side to the out-vehicle side and extend linearly to the out-vehicle side thereafter, and an out-vehicle side part in the bottom wall 20b locates at an upper level as compared to the in-vehicle side part. The flange piece 20g, which is a lower flange piece, is formed in the out-vehicle side of the [dent] *curved* part 20q. Thereby, it is possible to obtain clearance C between the flange piece 20g and a fog lamp 62 (see chain double dashed lines in FIG. 2 and FIG. 4) which is placed downward of the flange piece 20g and placed at the front side of the corner R formed by the below-described front wall 20c and the curved part 34 of the lower member 3.

Therefore, even if the fog lamp 62 moves rearward while being shaken up and down when the vehicle V is crashed lightly, it is possible to prevent breakage of the fog lamp 62 by avoiding a collision between the flange piece 20g and the fog lamp 62. In addition, it is possible to perform sandwiching weld bonding between the flange piece 20g and the flange piece 32 of the below-described lower member 3 by placing a welding device using the space at the [dent] *curved* part 20q. It should be noted that the fog lamp 62 is formed in a bumper face (not illustrated).

As shown in FIG. 7, the out-vehicle side ends 20s and 20t of the top wall 20a and the bottom wall 20b is inclined toward the front side frame 1 side as extending from the front to the rear so as to form a tapered shape.

<Front Wall>

As shown in FIG. 6, a flange piece 20h is formed to extend to the front at the out-vehicle side end of the front wall 20c. Bolt insertion holes 20r, 20r are provided to be spaced apart in the up-down direction at the in-vehicle side of the front wall 20c. In this embodiment, the in-vehicle side end of the front wall 20c is held between front and rear so as to be sandwiched between the first installation plate 15 and the second installation plate 16, and a three-sheets member laminated by the first installation plate 15, the front wall 20c, and the second installation plate 16 is combined (fastened) together with a bolt B. Thereby, since the front wall 20c is difficult to be separated from the first installation plate 15 at the time of a narrow offset collision, the impact load can be supported reliably.

In addition, as shown in FIG. 2, the outer peripheral surface of the front wall 20c is formed to have a shape of a curved surface (arc shape) in planar view. Meanwhile, a curved part 34, which is curved to the inner side (side of the gusset 2) in the vehicle width direction, is formed in the front end of the lower member 3, and the peripheral surface of the curved part 34 is formed in the shape of a curved surface in planar view. That is, the peripheral surface of the corner R formed by the front wall 20c of the gusset 2 and the curved part 34 of the lower member 3 forms a smooth continuous curved surface. Thereby, since it is possible to avoid large stress being locally applied to the flange joint portion of the gusset 2 and the lower member 3 or the front end of the lower member 3 at the time of a narrow offset collision, it is possible to propagate the impact load by efficiently distributing to the front side frame 1 and the lower member 3 and propagate the impact load input into the lower member 3 to the upper member 42.

<Reinforcement Member>

As shown in FIG. 4 and FIG. 7, the reinforcement member 21 is a member formed by performing press molding to one sheet of steel plate, and includes: a inclined part 21a (see FIG. 4) which closes the opening 20d of the body member 20 and has a U-shaped vertical cross-section; and an extension part 21b (see FIG. 7) which extends backward from the rear end of the inclined part 21a and has a substantially L-shaped vertical cross-section.

<Inclined Part>

As shown in FIG. 4, the inclined part 21a is a part placed between the top wall 20a and the bottom wall 20b. A pair of an upper flange 21c and a lower flange [21d], which are joined to the top wall 20a and the bottom wall 20b, are formed to extend to the out-vehicle side at the upper and lower ends of the inclined part 21a. In addition, as shown in FIG. 7, a front flange 21e, which is joined to the front wall 20c, is formed to extend to the out-vehicle side at the front end of the inclined part 21a. The inclined part 21a is inclined toward the side of the front side frame 1 as extending from the front to the rear in planar view, and forms an angle corresponding to the tapered shape of the out-vehicle side ends 20s and 20t of the top wall 20a and the bottom wall 20b, respectively.

In this embodiment, the inclined part 21a and the out-vehicle side ends 20s and 20t of the top wall 20a and the bottom wall 20b constitute the "tapered part" as recited in the Claims and the reference numeral 22 in the drawings indicates the tapered part. As shown in FIG. 5, the rear end 22a of the tapered part 22 is placed at front side of the first bending point P1 of the front side frame 1. By forming the tapered part 22 at the outer side of the gusset 2 in the vehicle width direction, it is possible to obtain the placement space S of in-vehicle parts (for example, a washer tank and a resonator) (not illustrated) between the front side frame 1 and the lower member 3 by adjusting the position (stabilized position) of the rear end 22a of the tapered part 22 as suitable in the vehicle front-rear direction.

<Extension Part>

As shown in FIG. 5 and FIG. 7, the extension part 21b is a portion which extends backward from the rear end of the inclined part 21a (tapered part 22) to the first bending point P1. The extension part 21b serves to propagate the impact load from the body member 20 or the inclined part 21a to the first bending point P1 at the time of a narrow offset collision. As shown in FIG. 7, the extension part 21b is formed to have size smaller than the width of the top wall 20a and the bottom wall 20b. A suitable location in the extension part 21b is joined to the side surface of the outer member 11 at the out-vehicle side by a fixing means, such as welding. At the upper end of the extension part 21b, the upper flange 21f is formed to extend to the out-vehicle side*, or in other words protrudes in the vehicle width direction,* and the upper flange 21f is formed successively to the upper flange 21c of the inclined part 21a.

Figure 8:
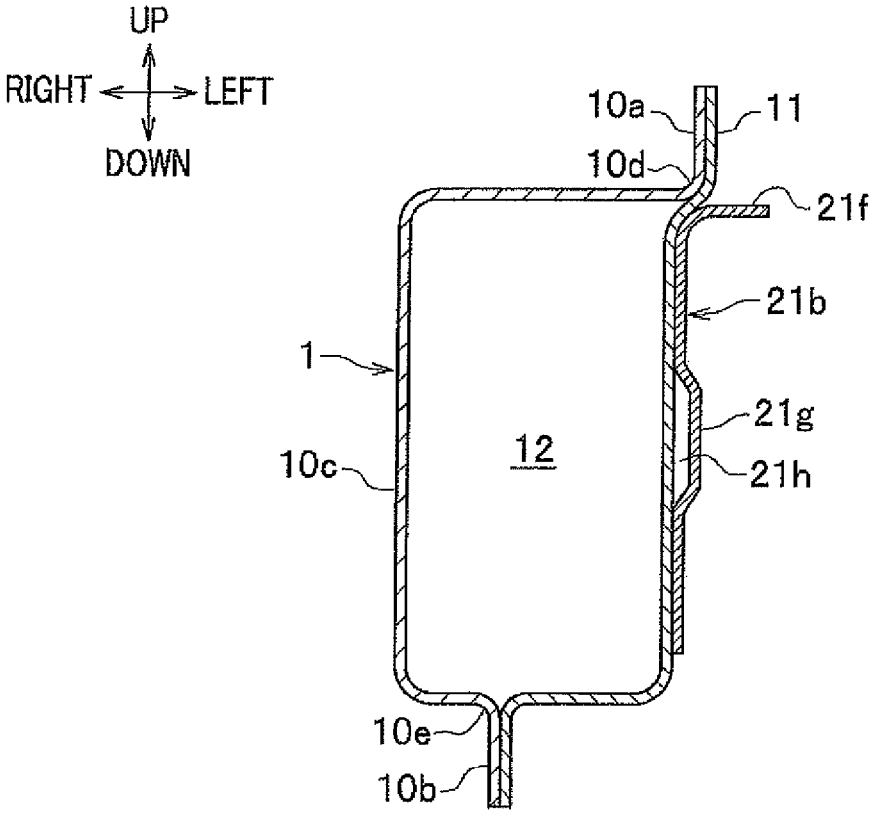
FIG. 8 is a cross-sectional view taken along the line III-III of FIG. 7.

FIG. 8 is a cross-sectional view taken along the line III-III of FIG. 7. As shown in FIG. 7 and FIG. 8, a bead 21g which extends along the vehicle front-rear direction is formed at substantially the center of the extension part 21b and the bead 21g protrudes in a direction opposite to the front side frame 1*, or in other words protrudes in the vehicle width direction*. As a result of having the bead 21g, a closed cross-section 21h is formed between the extension part 21b and the outer member 11 of the front side frame 1. It should be noted that, as shown in FIG. 8, the rear end side of the outer member 11 has a substantially Z-shaped vertical cross-section (a crank shape).

In this embodiment, strength and rigidity of the extension part 21b can be improved by providing the upper flange 21f and the bead 21g, which have high rigidity. In addition, since the extension part 21b forms a closed cross-section 21h with the outer member 11 of the front side frame 1, it is possible to obtain a structure whose strength and rigidity are improved. Thereby, even in a case where the width of the extension part 21b is made small as a result of the load propagation efficiency to the first bending point P1 being improved, the impact load can be propagated to the first bending point P1 reliably. In addition, since the width of the extension part 21b can be made small, it is possible to obtain the placement space S much more suitably between the front side frame 1 and the lower member 3.

As shown in FIG. 4, in this embodiment, a closed cross-section 23, which is hollow, is formed in the gusset 2 by the opening 20d of the body member 20 being closed by the inclined part 21a of the reinforcement member 21 and the opening 20e of the body member 20 being closed by the outer member 11 of the front side frame 1. By forming this closed cross-section 23, it is possible to obtain a structure whose strength and rigidity of the gusset 2 are improved. A bulkhead 24 which extends along the vehicle front-rear direction is placed at the closed cross-section 23.

<Bulkhead>

The bulkhead 24, which is a first bulkhead, is a steel member for reinforcing the gusset 2. The bulkhead 24 serves to propagate the impact load to the front side frame 1 reliably by improving strength and rigidity of the gusset 2 and preventing the cross-sectional deformation caused by the impact load, and bending-deform the front side frame 1. In addition, as shown in FIG. 5, the bulkhead 24 serves to promote the load propagation from the front wall 20c to the inclined part 21a by being placed between the front wall 20c and the inclined part 21a.

As shown in FIG. 3 or FIG. 5, the bulkhead 24 includes: a base 24a which has a rectangular shape in side view; and four flanges 24b, 24b which extend from the outer circumference (four sides) of the base 24a to the in-vehicle side. The flange 24b is joined to the top wall 20a, the bottom wall 20b, the front wall 20c, and the inclined part 21a, respectively, by a fixing means, such as welding.

<Lower Member>

As shown in FIG. 6, the lower member 3 is a steel member which is placed at the outer side of the front side frame 1 and the gusset 2 in the vehicle width direction and has a substantially square-shaped vertical cross-section. Three flange pieces 31-33 are formed to extend to the outer direction (upper direction, lower direction, and front direction) at the front end (curve 34) of the lower member 3 and the flange pieces 31-33 are joined to the flange pieces 20f-20h of the gusset 2 by a fixing means, such as welding. That is, the lower member 3 is joined to the tapered part 22 of the gusset 2 via the flange pieces 20f-20h. It should be noted that the flange piece 32 corresponds to "lower member side lower flange piece" in the Claims.

Thereby, it is possible to propagate suitably to the lower member 3 the impact load applied to the gusset 2 at the time of a narrow offset collision and therefore propagate the impact load by distributing to the front side frame 1 and the lower member 3, and thus it is possible to improve absorbability of the impact energy. Meanwhile, in this embodiment, as a result of the gusset 2 and the lower member 3 being joined at three points via the flange pieces 20f-20h and 31-33, it is possible to obtain a structure having brittleness such that the front end side of the front side frame 1 can be crushed at the time of a full flat collision in which an oncoming vehicle or the like is crashed into the bumper beam 54 of the vehicle V.

Furthermore, in this embodiment, since the inclined part 21a is formed at the out-vehicle side of the gusset 2, the out-vehicle side of the gusset 2 is more difficult to be crushed than the in-vehicle side. That is, since the in-vehicle side of the gusset 2 is easier to be crushed than the out-vehicle side, the crush at the front end side of the front side frame 1 is not spoiled and thus it is possible to obtain a structure having brittleness such that the front side frame 1 can be crushed.

A vehicle V to which the vehicle body front structure according to this embodiment is applied basically has a structure as described above and its operations and advantageous effects will be described below.

Figure 9A:
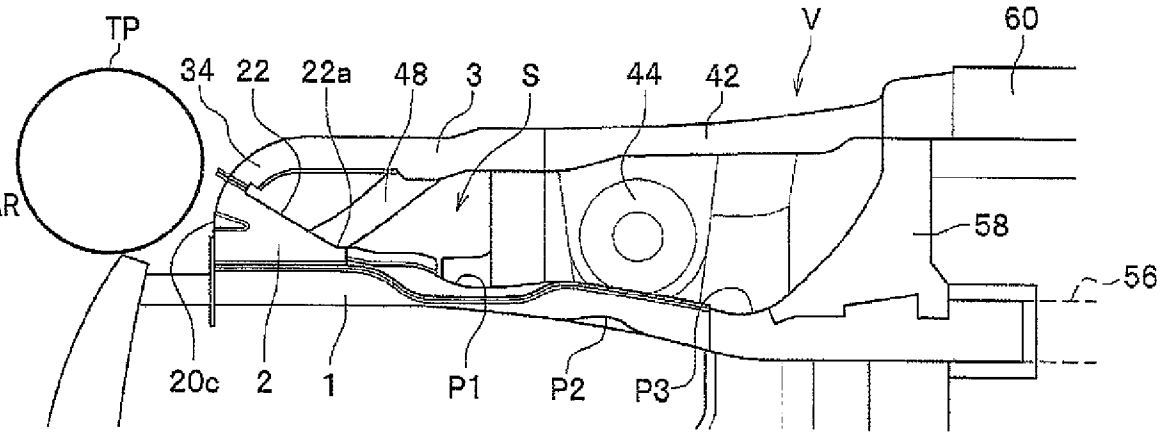
FIG. 9A is a bottom view showing a situation before the vehicle implementing the vehicle body front structure according to an embodiment of the present invention experiences a narrow offset collision against a utility pole.
Figure 9B:
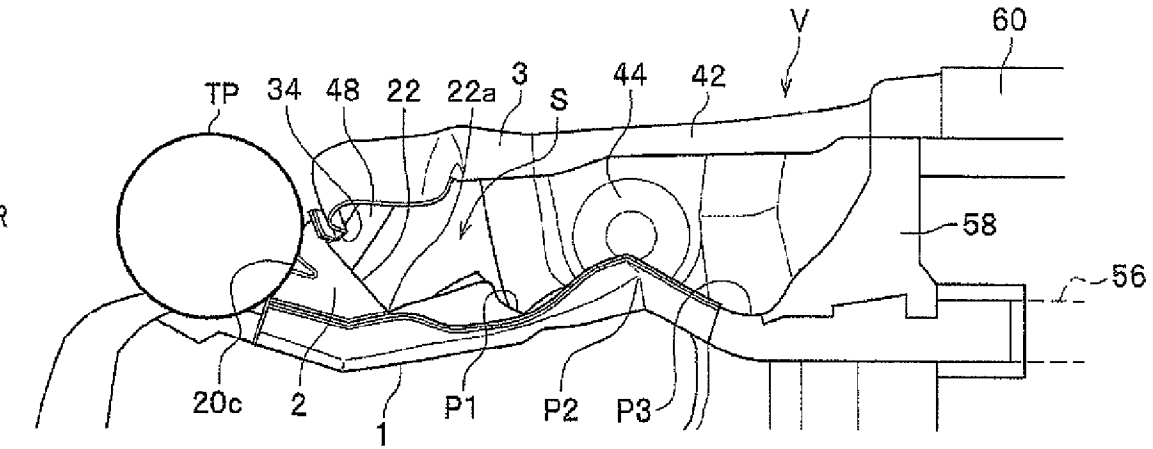
FIG. 9B is a bottom view showing a situation when the vehicle experiences a narrow offset collision.

FIG. 9A is a bottom view showing a situation before the vehicle implementing the vehicle body front structure according to an embodiment of the present invention experiences a narrow offset collision; and FIG. 9B is a bottom view showing a situation when the vehicle experiences a narrow offset collision.

As shown in FIGS. 9A and 9B, when the vehicle V according to this embodiment experiences a narrow offset collision with, for example, a utility pole TP, which is a colliding object, the utility pole TP passes through the outer side of the front side frame 1 and is crashed into the front wall 20c of the gusset 2 and then the gusset 2 is pressed rearward by a utility pole TP. Then, the impact load is propagated to the front side frame 1 and the lower member 3, which are joined together by the gusset 2.

As a result, after the front side frame 1 is first bent by the impact load with the first bending point P1 serving as a basic point, the front side frame 1 bends with the second bending point P2 and the third bending point P3 serving as a basic point, and thus it is possible to absorb impact energy by bending-deformation at the three locations of the front side frame 1.

Meanwhile, the lower member 3 is crushed by the impact load and thus it is possible to further absorb impact energy by deformation of the lower member 3 also. In addition, the impact load propagated to the lower member 3 is propagated to the upper member 42, and when the impact energy cannot be absorbed by only the deformation of the lower member 3, the upper member 42 is also crushed and thus it is possible to absorb the impact energy with the deformation of the upper member 42 also.

In this case, in this embodiment, since the inner side of the gusset 2 in the vehicle width direction extends from the front end of the front side frame 1 to the first bending point P1 by being joined to the outer side of the front side frame 1 in the vehicle width direction, the impact load applied to the gusset 2 can be propagated to the front side frame 1 reliably. In particular, in this embodiment, since the inner side of the gusset 2 in the vehicle width direction extends to the first bending point P1 of the front side frame 1, it is possible to propagate the impact load to the first bending point P1 reliably and the front side frame 1 can absorb the impact energy by being bending-deformed.

In addition, in this embodiment, since the bulkhead 24 is placed at inside of the gusset 2 (closed cross-section 23), it is possible to prevent the cross-sectional deformation caused by the impact load by improving strength and rigidity of the gusset 2. Therefore, at the time of a narrow offset collision, it is possible to make the front side frame 1 to be bending-deformed by propagating the impact load to the front side frame 1 reliably by the retreated gusset 2.

In addition, in this embodiment, the bulkhead 13 is placed at inside of the front side frame 1 (closed cross-section 12) and the bulkhead 13 is provided at a position that overlaps with the rear end 22a of the tapered part 22 of the gusset 2 along the vehicle width direction, and therefore it is possible to reinforce the portion corresponding to the boundary between the tapered part 22 and the extension part 21b in the front side frame 1 and thus the load propagation between the tapered part 22 and the extension part 21b can be performed smoothly.

In addition, in this embodiment, the stiffener 14 is placed at inside of the front side frame 1 (closed cross-section 12) and the stiffener 14 extends from a position frontward of the rear end 22a of the tapered part 22 to the first bending point P1, and therefore the front side frame 1 can be reinforced, enabling smooth load propagation to the first bending point P1.

In addition, in this embodiment, since the front end of the lower member 3 is joined to the tapered part 22 of the gusset 2, it is possible to propagate the impact load applied to the gusset 2 distributively to the front side frame 1 and the lower member 3 at the time of a narrow offset collision.

In addition, in this embodiment, since the gusset 2 is placed between the front side frame 1 and the lower member 3, it is possible to obtain the placement space S for in-vehicle parts suitably between the front side frame 1 and the lower member 3. In this embodiment, especially, since the tapered part 22 is formed at the outer side of the gusset 2 in the vehicle width direction, it is possible to obtain the placement space S for in-vehicle parts suitably between the front side frame 1 and the lower member 3 by adjusting the position (stabilized position) of the rear end 22a of the tapered part 22 as appropriate in the vehicle front-rear direction. As a result, it is possible to improve flexibility in the layout of in-vehicle parts.

In addition, in this embodiment, since the front side frame 1 and the gusset 2 each have a hat-shaped cross-section where pairs of flanges 10a, 10b, 20i and 20j extend along the vehicle front-rear direction and are joined together via the flanges 10a, 10b, 20i and 20j, it is possible to form a total of four flange ridgelines 10d, 10e, 20k and 20m, which extend along the vehicle front-rear direction, and thus it is possible to improve strength and rigidity of the gusset 2 with respect to the impact load. In addition, at the time of a narrow offset collision, it is possible to propagate the impact load applied to the gusset 2 to the front side frame 1 reliably through the four flange ridgelines 10d, 10e, 20k and 20m, and thus it is possible to absorb the impact energy by the front side frame 1 being bending-deformed.

In addition, in this embodiment, since the peripheral surface of the corner R formed by the front wall 20c of the gusset 2 and the curved part 34 of the lower member 3 forms a smooth continuous curved surface, it is possible to avoid large stress being locally applied to the flange joint portion between the gusset 2 and the lower member 3 and the front end of the lower member 3 at the time of a narrow offset collision, and therefore it is possible to propagate the impact load to the front side frame 1 and the lower member 3 by distributing efficiently, and thus it is possible to propagate to the upper member 42 the impact load input to the lower member 3.

In addition, in this embodiment, since the gusset 2 and the lower member 3 are joined together via the flange pieces 20f-20h, 31-33, it is possible to propagate the impact load applied to the gusset 2 suitably to the lower member 3 at the time of a narrow offset collision, and therefore it is possible to propagate the impact load to the front side frame 1 and the lower member 3 distributively, and thus it is possible to improve absorbability of the impact energy. Meanwhile, in this embodiment, since the gusset 2 and the lower member 3 are joined at three points through the flange pieces 20f-20h, 31-33, it is possible to obtain a structure having brittleness such that the front end side of the front side frame 1 can be crushed at the time of a full flat collision where an oncoming vehicle or the like is crashed into the bumper beam 54 of the vehicle V.

In addition, in this embodiment, the in-vehicle side end of the front wall 20c is held between front and rear by being sandwiched between the first installation plate 15 and the second installation plate 16, and the three-plate member laminated with the first installation plate 15, the front wall 20c, and the second installation plate 16 is joined together with the bolt B, and therefore the front wall 20c tends not to be separated from the first installation plate 15 at the time of a narrow offset collision, and thus it is possible to support the impact load reliably.

In addition, in this embodiment, as a result of having the depressed portions 20n and 20p that are depressed downward or upward in the top wall 20a and the bottom wall 20b at the boundary with the front wall 20c, it is possible to absorb laxation in the top wall 20a and the bottom wall 20b by the depressed portions 20n and 20p such that formation of wrinkles is prevented, and improve strength and rigidity of the body member 20 upon press molding together the body member 20 including the curved surface-shaped front wall 20c.

In addition, in this embodiment, since the gusset 2 has the extension part 21b which extends backward from the rear end 22a of the tapered part 22 to the first bending point P1, it is possible to propagate the impact load reliably to the first bending point P1 by the extension part 21b. In particular, in this embodiment, as a result of having the upper flange 21f and the bead 21g in the extension part 21b, it is possible to improve strength and rigidity of the extension part 21b, and thus it is possible to improve load propagation efficiency to the first bending point P1. Furthermore, in this embodiment, since the extension part 21b forms a closed cross-section 21h with the outer member 11 of the front side frame 1, it is possible to obtain a structure in which strength and rigidity are further improved and thus it is possible to improve load propagation efficiency to the first bending point P1 furthermore.

When only the position of the rear end 22a of the tapered part 22 is moved to the front without changing the position of the front end of the tapered part 22 from the situation shown in FIG. 5, an angle formed by the front side frame 1 and the tapered part 22 is widened, and as a result, the component of force of the impact load that acts onto the gusset 2 in the vehicle width direction increases, and therefore it is preferable to have a structure where the bulkhead 24 is moved to the outer side in the vehicle width direction as compared to the center of the gusset 2. According to such a structure, it is possible to propagate the impact load to the front side frame 1 and the lower member 3 reliably by making the portion of the gusset 2 at the outer side in the vehicle width direction difficult to be crushed.

In addition, in this embodiment, as a result of forming the upper flange 21f, which extends along the vehicle front-rear direction, and the bead 21g in the extension part 21b, strength and rigidity of the extension part 21b improve and it is possible to propagate the impact load to the first bending point P1 reliably even if the width of the extension part 21b is made small. Furthermore, since the width of the extension part 21b can be made small, it is possible to obtain the placement space S further between the front side frame 1 and the lower member 3.

In addition, in this embodiment, the [dent] *curved* part 20q, which has a vertical cross-section that is [dented] *curved* upward, is formed at the out-vehicle side of the bottom wall 20b, and the flange piece 20g is formed at the out-vehicle side of the [dent] *curved* part 20q, and therefore it is possible to obtain clearance C between the flange piece 20g and the fog lamp 62. Accordingly, when the vehicle V experiences a light collision, even if the fog lamp 62 is moved rearward while being shaken up and down, it is possible to prevent breakage of the fog lamp 62 by avoiding a collision between the flange piece 20g and the fog lamp 62. Furthermore, it is possible to perform sandwiching weld bonding between the flange piece 20g and the flange piece 32 of the lower member 3 by placing a welding device using the space at the [dent] *curved* part 20q.

Although the embodiments of the present invention have been described in detail with reference to the drawings, the present invention is not limited to these and can be suitably modified within a range that does not go beyond the spirit of the invention.

Although the first bending point P1 to the third bending point P3 are formed by denting the front side frame 1 locally to the outer side or the inner side in the vehicle width direction in this embodiment, the present invention is not limited to this and may form the bending point by other methods that form strong parts and weak parts in strength and rigidity.

Although the body member 20 of the gusset 2 in this embodiment if formed in a triangular shape in planar view, the present invention is not limited to this and the body member 20 may be formed in other shape, such as a pentagonal shape in planar view, as long as the inner side in the vehicle width direction is joined to the front side frame 1 and there is the tapered part 22 at the outer side in the vehicle width direction.

Although the gusset 2 in this embodiment is formed by steel members, the present invention is not limited to this and the gusset 2 may be formed by press molding plate material made of other metal, such as an aluminum plate.

In this embodiment, the bead 21g and the upper flange 21f are formed in order to improve strength and rigidity of the extension part 21b but the present invention is not limited to this and may further form a lower flange in the lower end of the extension part 21b. In addition, only one element may be selected suitably among these three elements and two elements may be selected and combined suitably among the three elements.

What is claimed is:

1. A vehicle body front structure, comprising:

a front side frame which extends along a vehicle front-rear direction;

a lower member placed at an outer side of the front side frame in a vehicle width direction; and a gusset placed between the front side frame and the lower member, wherein the front side frame has a bending point which is provided at a part along the front side frame in the vehicle front-rear direction, and *the front side frame* absorbs an impact load by receiving the impact load and being bent *at the bending point* upon a collision of a vehicle;

an inner side of the gusset in the vehicle width direction is joined to an outer side of the front side frame in the vehicle width direction and extends from a front end of the front side frame to the bending point; [and]

a tapered part which is inclined toward the front side frame as extending backward from a front end of the gusset is formed at an outer side of the gusset in the vehicle width direction, *and*

*the gusset is placed laterally between the front side frame and the lower member in the vehicle width direction.*

2. The vehicle body front structure according to claim 1, wherein the gusset has a hollow part, and a first bulkhead which extends along the vehicle front-rear direction is placed in the hollow part.

3. The vehicle body front structure according to claim 1, wherein the gusset has an extension part which extends backward from a rear end of the tapered part to the bending point, and a [second] bulkhead is placed inside the front side frame at a position that overlaps with the rear end of the tapered part of the gusset along the vehicle width direction.

4. The vehicle body front structure according to claim 1, wherein [the] *a* rear end of the tapered part of the gusset is [placed at] *disposed* frontward of the bending point of the front side frame, and a stiffener which extends backward at least from the rear end of the tapered part of the gusset is placed inside the front side frame.

5. The vehicle body front structure according to claim 1, wherein a front end of the lower member *extends inward and* is joined to [the tapered part of] the gusset.

6. The vehicle body front structure according to claim 3, wherein a [high rigidity] *rigidity-improving* part which extends along the vehicle front-rear direction is formed in the extension part.

7. The vehicle body front structure according to claim 1, wherein the front side frame [and] *includes an inner member which in cross section has three closed sides and one open side, with a pair of flanges that extend along the vehicle front-rear direction at upper and lower ends of the open side of the inner member,* the gusset [respectively have a hat-shaped cross-section in which] *has opposing top and bottom walls and an open side between the top and bottom walls, with* a pair of flanges that [extends] *extend* along the vehicle front-rear direction [is formed] at upper and lower ends *of the open side of the gusset*, and *the inner member and the gusset* are joined together via the [flange] *flanges*.

8. The vehicle body front structure according to claim 7, wherein the gusset has a front wall, the tapered part is inclined toward the front side frame as extending backward from an outer side of the front wall in the vehicle width direction, the lower member includes a curved part which is formed in a front end of the lower member and is curved [to] *toward* the gusset [side] to be joined to the tapered part, and a peripheral surface of a corner formed by the front wall and the curved part forms a curved surface.

9. The vehicle body front structure according to claim 8, wherein the gusset includes a plurality of flange pieces which extend from the front wall and the tapered part, the lower member includes a plurality of flange pieces which extend from the curved part, and the gusset and the lower member are joined together via the flange pieces.

10. The vehicle body front structure according to claim 8, wherein the gusset [includes a] bottom wall [which] extends backward from a lower end of the front wall, a [dent] *curved* part which [resides upward] *curves upwardly* as compared to an inner side of the bottom wall in the vehicle width direction is provided at an outer side in the bottom wall in the vehicle width direction, a lower flange piece which extends downward is provided at an outer side in the [dent] *curved* part *of the bottom wall* in the vehicle width direction, a lower [member side lower] flange piece [which is joined to the lower flange piece] is provided in the curved part of the lower member *and is joined to the lower flange piece of the bottom wall*, and a fog lamp is [placed at] *disposed* downward of the lower flange [piece] *pieces* and frontward of the corner.

11. The vehicle body front structure according to claim 8, further comprising:

a first plate joined to the front end of the front side frame; and a second plate which is [placed] *disposed* frontward of the first plate and to which a rear end of a bumper beam extension is attached, wherein an inner side of the front wall in the vehicle width direction is held sandwiched between the first plate and the second plate, and the front wall, the first plate, and the second plate are fastened together.

12. The vehicle body front structure according to claim 10, wherein the gusset [includes a] top wall [which] extends backward from an upper end of the front wall, the top wall, the front wall, and the bottom wall are [formed together by press molding] *combined as a single pressed member*, a depressed portion which is depressed downward is formed in the top wall at a boundary with the front wall, and a depressed portion which is depressed upwards is formed in the bottom wall at a boundary with the front wall.

13. The vehicle body front structure according to claim 8, wherein the gusset includes: an extension part which extends backward from a rear end of the tapered part to the bending point; and [an extended] *a* flange which is provided [at least one of] *on* an upper end [and a lower end] of the extension part.

[14. The vehicle body front structure according to claim 13, wherein the extension part is joined to the outer side of the front side frame in the vehicle width direction, a bead which extends along the vehicle front-rear direction to protrude in a direction opposite to the front side frame, and a closed cross-section is formed between the bead and the front side frame.]

*15. The vehicle body front structure according to claim 1, wherein the front side frame is dented locally in the vehicle width direction at the bending point.*

*16. A vehicle body front structure, comprising:*

*a front side frame which extends along a vehicle front-rear direction; and*

*a gusset which is connected to an outside of the front side frame, wherein*

*the front side frame has a bending point which is provided at a part along the front side frame in the vehicle front-rear direction, and the front side frame absorbs an impact load by receiving the impact load and being bent at the bending point upon a collision of a vehicle;*

*an inner side of the gusset in the vehicle width direction extends in the vehicle front-rear direction and is joined to an outer side of the front side frame in the vehicle width direction, the outer side of the front side frame also extends in the vehicle front-rear direction, and the inner side of the gusset extends from a front end of the front side frame to the bending point so that an impact load applied to the gusset from a narrow offset collision propagates to the front side frame;*

*a tapered part which is inclined toward the front side frame as extending backward from a front end of the*

*gusset is formed at an outer side of the gusset in the vehicle width direction; and*

*the gusset has a hollow part, and a first bulkhead which extends along the vehicle front-rear direction is placed in the hollow part.*

*17. The vehicle body front structure according to claim 16, wherein the gusset extends backward to the bending point, and*

*a second bulkhead is placed inside the front side frame at a position that overlaps with a rear end of the tapered part of the gusset along the vehicle width direction.*

*18. The vehicle body front structure according to claim 17, wherein the gusset includes a rigidity-improving part which projects in the vehicle width direction and extends along the vehicle front-rear direction.*

*19. The vehicle body front structure according to claim 16, wherein the gusset is substantially triangular in shape in plan view such that a front end thereof is wider than a rear end thereof.*

*20. The vehicle body front structure according to claim 16, wherein the gusset has an extension part which extends backward from a rear end of the tapered part to the bending point.*

*21. A vehicle body front structure, comprising:*

*a front side frame which extends along a vehicle front-rear direction; and*

*a gusset which is connected to an outside of the front side frame, wherein*

*the front side frame has a bending point which is provided at a part along the front side frame in the vehicle front-rear direction, and the front side frame absorbs an impact load by receiving the impact load and being bent at the bending point upon a collision of a vehicle;*

*an inner side of the gusset in the vehicle width direction extends in the vehicle front-rear direction and is joined to an outer side of the front side frame in the vehicle width direction, the outer side of the front side frame also extends in the vehicle front-rear direction, and the inner side of the gusset extends from a front end of the front side frame to the bending point so that an impact load applied to the gusset from a narrow offset collision propagates to the front side frame;*

*a tapered part which is inclined toward the front side frame as extending backward from a front end of the gusset is formed at an outer side of the gusset in the vehicle width direction;*

*a rear end of the tapered part of the gusset is disposed frontward of the bending point of the front side frame, and*

*a stiffener which extends backward at least from the rear end of the tapered part of the gusset is placed inside the front side frame.*

*22. A vehicle body front structure, comprising:*

*a front side frame which extends along a vehicle front-rear direction; and*

*a gusset which is connected to an outside of the front side frame, wherein*

*the front side frame has a bending point which is provided at a part along the front side frame in the vehicle front-rear direction, and the front side frame absorbs an impact load by receiving the impact load and being bent at the bending point upon a collision of a vehicle;*

*an inner side of the gusset in the vehicle width direction extends in the vehicle front-rear direction and is joined to an outer side of the front side frame in the vehicle width direction, the outer side of the front side frame also extends in the vehicle front-rear direction, and the inner side of the gusset extends from a front end of the front side frame to the bending point so that an impact load applied to the gusset from a narrow offset collision propagates to the front side frame;*

*a tapered part which is inclined toward the front side frame as extending backward from a front end of the gusset is formed at an outer side of the gusset in the vehicle width direction;*

*the front side frame includes an inner member which in cross section has three closed sides and one open side, with a pair of flanges that extend along the vehicle front-rear direction at upper and lower ends of the open side of the inner member, the gusset has opposing top and bottom walls and an open side between the top and bottom walls, with a pair of flanges that extend along the vehicle front-rear direction at upper and lower ends of the open side of the gusset, and the inner member and the gusset are joined together via the flanges.*

*23. A vehicle body front structure, comprising:*

*a front side frame which extends along a vehicle front-rear direction; and*

*a gusset which is connected to an outside of the front side frame, wherein*

*the front side frame has a bending point which is provided at a part along the front side frame in the vehicle front-rear direction, and the front side frame absorbs an impact load by receiving the impact load and being bent at the bending point upon a collision of a vehicle;*

*an inner side of the gusset in the vehicle width direction extends in the vehicle front-rear direction and is joined to an outer side of the front side frame in the vehicle width direction, the outer side of the front side frame also extends in the vehicle front-rear direction, and the inner side of the gusset extends from a front end of the front side frame to the bending point so that an impact load applied to the gusset from a narrow offset collision propagates to the front side frame;*

*a tapered part which is inclined toward the front side frame as extending backward from a front end of the gusset is formed at an outer side of the gusset in the vehicle width direction; and*

*the gusset has a bead which extends along the vehicle front-rear direction and protrudes in the vehicle width direction on an outer surface of the gusset.*

* * * * *